US 12,529,334 B2

(12) United States Patent
Hield et al.

(10) Patent No.: US 12,529,334 B2
(45) Date of Patent: *Jan. 20, 2026

(54) HEAT EXCHANGER

(71) Applicant: ROLLS-ROYCE plc, London (GB)

(72) Inventors: Paul M Hield, Bristol (GB); Jonathan A Cherry, Bristol (GB); Thomas S Binnington, Bristol (GB)

(73) Assignee: ROLLS-ROYCE plc, London (GB)

( * ) Notice: Subject to any disclaimer, the term of this patent is extended or adjusted under 35 U.S.C. 154(b) by 320 days.

This patent is subject to a terminal disclaimer.

(21) Appl. No.: 17/494,738

(22) Filed: Oct. 5, 2021

(65) Prior Publication Data

US 2022/0205389 A1 Jun. 30, 2022

(30) Foreign Application Priority Data

Oct. 9, 2020 (GB) ..................................... 2016000
Jan. 26, 2021 (GB) ..................................... 2101015
Feb. 11, 2021 (GB) ..................................... 2101867

(51) Int. Cl.
*F02C 7/04* (2006.01)
*B64D 33/02* (2006.01)
*B64D 33/08* (2006.01)
*B64D 33/10* (2006.01)
*F01D 9/06* (2006.01)
*F02C 7/08* (2006.01)
(Continued)

(52) U.S. Cl.
CPC ............... *F02C 7/04* (2013.01); *B64D 33/02* (2013.01); *B64D 33/08* (2013.01); *B64D 33/10* (2013.01);
(Continued)

(58) Field of Classification Search
CPC ....... F02C 7/04–057; B64D 2033/0206–0293; B64D 33/02; B64D 33/08–12;
(Continued)

(56) References Cited

U.S. PATENT DOCUMENTS 4,601,202 A 7/1986 Colman et al.
8,657,895 B2 * 2/2014 Kline ..................... F02C 7/055
55/306
(Continued)

FOREIGN PATENT DOCUMENTS

EP 1916399 A2 4/2008
EP 2 085 600 B1 6/2012
(Continued)

OTHER PUBLICATIONS

"Turbofan engine", Aug. 21, 2019, https://en.wikipedia.org/wiki/Turbofan_engine, from internet archive Wayback Machine (Year: 2019).*
(Continued)

*Primary Examiner* — Stephanie Sebasco Cheng
(74) *Attorney, Agent, or Firm* — Oliff PLC

(57) ABSTRACT

A turbofan gas turbine engine comprises, in axial flow sequence, a heat exchanger module, a fan assembly, a compressor module, a turbine module, and an exhaust module. The fan assembly comprises a plurality of fan blades defining a fan diameter (D). The heat exchanger module is in fluid communication with the fan assembly by an inlet duct, and the heat exchanger module comprises a plurality of radially-extending hollow vanes arranged in a circumferential array with a channel extending axially between each pair of adjacent hollow vanes. The heat exchanger module has a square axial cross-sectional profile, where a side length of the square cross-section is D.

15 Claims, 13 Drawing Sheets

(51) Int. Cl.
  *F02C 7/12* (2006.01)
  *F02C 7/14* (2006.01)
  *F02C 7/18* (2006.01)
  *F02K 3/06* (2006.01)
  *F02K 3/115* (2006.01)

(52) U.S. Cl.
  CPC ............... *F01D 9/065* (2013.01); *F02C 7/08* (2013.01); *F02C 7/12* (2013.01); *F02C 7/18* (2013.01); *F02K 3/06* (2013.01); *B64D 2033/024* (2013.01); *B64D 2033/0286* (2013.01); *F02C 7/14* (2013.01); *F02K 3/115* (2013.01); *F05D 2220/323* (2013.01); *F05D 2220/36* (2013.01); *F05D 2260/213* (2013.01)

(58) Field of Classification Search
  CPC ... B64D 2013/0607; F02K 3/06; F02K 3/065; F02K 3/115; F01D 25/02; F01D 9/065; F05D 2250/12; F05D 2250/121; F05D 2250/13; F05D 2250/131; F05D 2250/22; F05D 2250/221
  See application file for complete search history.

(56) References Cited

U.S. PATENT DOCUMENTS

| | | | |
|---|---|---|---|
| 9,777,631 B2* | 10/2017 | Powell | F02K 3/075 |
| 10,215,096 B2* | 2/2019 | Suciu | F02C 7/04 |
| 11,549,438 B2* | 1/2023 | Bradbrook | F01D 21/14 |
| 11,649,730 B2* | 5/2023 | Bradbrook | F02C 7/08 415/1 |
| 11,649,767 B2* | 5/2023 | Bradbrook | F02C 7/185 60/266 |
| 2021/0102492 A1 | 4/2021 | Rambo et al. | |
| 2021/0270148 A1* | 9/2021 | Marchaj | F02C 7/18 |

FOREIGN PATENT DOCUMENTS

| | | | | |
|---|---|---|---|---|
| EP | 3 026 240 A1 | 6/2016 | | |
| EP | 3 290 846 A1 | 3/2018 | | |
| FR | 2329517 A | * | 7/1977 | B65B 43/46 |
| GB | 2 238 080 A | | 5/1991 | |
| GB | 2512442 A | | 10/2014 | |
| GB | 2591298 A | | 7/2021 | |
| WO | WO-0229224 A1 | * | 4/2002 | B64D 33/02 |

OTHER PUBLICATIONS

Mar. 30, 2022 Extended European Search Report issued in European Patent Application No. 21198494.3.
Mar. 19, 2021 Combined Search and Examination Report issued in Great Britain Patent Application No. 2016000.8.
Aug. 12, 2021 Combined Search and Examination Report issued in Great Britain Patent Application No. 2101867.6.
Jul. 8, 2021 Combined Search and Examination Report issued in Great Britain Patent Application No. 2101015.2.

* cited by examiner

VIEW ON C-C

HEAT EXCHANGER

This disclosure claims the benefit of UK Patent Application No. GB 2016000.8, filed on 9 Oct. 2020, UK Patent Application No. GB 2101015.2, filed on 26 Jan. 2021, and UK Patent Application No. GB 2101867.6, filed on 11 Feb. 2021, each of which is hereby incorporated herein in its entirety.

FIELD OF THE DISCLOSURE

The present disclosure relates to a circumferential vane array accommodating a heat exchanger and particularly to a circumferential vane array accommodating a heat exchanger, for use with a turbofan gas turbine engine.

BACKGROUND TO THE DISCLOSURE

A conventional turbofan gas turbine engine uses heat exchangers to cool a variety of fluids including inter alia air, fuel and oil. Typically, such heat exchangers use bypass air or an air offtake from the compressor as the cooling medium. The heat exchanger itself may be positioned in the bypass duct or externally to the engine with the corresponding ducting.

The use of bypass air or a compressor offtake stream as the cooling medium in a heat exchanger will adversely affect the performance of the engine, for example by reducing specific thrust or increasing specific fuel consumption. Alternatively, or additionally, such offtakes can adversely affect engine performance, for example by reducing surge margin.

In a further alternative conventional arrangement, an air flow to provide the cooling medium in a heat exchanger may be drawn separately from the air flow through the gas turbine engine. For example, in an airframe application the air flow providing the cooling medium may be drawn from an air intake or duct separate from the engine.

As used herein, a range "from value X to value Y" or "between value X and value Y", or the likes, denotes an inclusive range; including the bounding values of X and Y. As used herein, the term "axial plane" denotes a plane extending along the length of an engine, parallel to and containing an axial centreline of the engine, and the term "radial plane" denotes a plane extending perpendicular to the axial centreline of the engine, so including all radial lines at the axial position of the radial plane. Axial planes may also be referred to as longitudinal planes, as they extend along the length of the engine. A radial distance or an axial distance is therefore a distance in a radial or axial plane, respectively.

STATEMENTS OF DISCLOSURE

According to a first aspect of the present disclosure there is provided a turbofan gas turbine engine comprising, in axial flow sequence, a heat exchanger module, a fan assembly, a compressor module, a turbine module, and an exhaust module, the fan assembly comprising a plurality of fan blades defining a fan diameter (D), the heat exchanger module being in fluid communication with the fan assembly by an inlet duct, the heat exchanger module comprising a plurality of radially-extending hollow vanes arranged in a circumferential array with a channel extending axially between each pair of adjacent hollow vanes, wherein the heat exchanger module has a square axial cross-sectional profile, where a side length of the square cross-sectional profile is E.

In the turbofan gas turbine engine of the present arrangement, the intake air entering the fan assembly must first pass through the heat exchanger module. The presence of the circumferential array of radially extending vanes in the heat exchanger module results in a pressure drop across the heat exchanger module. This in turn restricts the intake air flow entering the turbofan gas turbine engine via the fan assembly and as an adverse effect on the performance of the engine.

Providing the heat exchanger module with a square axial cross-sectional profile increases the area across which the intake air passes and so reduces the pressure drop across the heat exchanger module. This improves the performance of the engine relative to the configuration having a heat exchanger module with a circular cross-sectional profile.

Optionally, the square cross-sectional profile comprises a side length E, the side length E being in the range of between 1.0*D and 1.5*D.

In one arrangement, the side length E of the square axial cross-sectional profile is equal to the fan diameter D. This makes the packaging of the turbofan gas turbine engine into an airframe or other machine body easier and more convenient for a user.

Optionally, a side length E of the square cross-sectional profile is less than D.

By making the side length E of the square axial cross-sectional profile smaller than the fan diameter D, it becomes possible to further streamline the forward portion of the gas turbine engine assembly. This enables a user to more aerodynamically package the gas turbine engine in a machine body.

Optionally, each corner of the square cross-sectional profile comprises a curved profile.

In one arrangement, the axial cross-sectional profile of the heat exchanger module is a superellipse defined by $$x = \sqrt[n]{R^n - y^n}$$

where: x and y are cartesian co-ordinates for a point on the superellipse;
R is the half-side length of the axial cross-sectional profile (i.e. R=E/2); and
n lies in the range of between 2 and 10.

The superellipse is a broadly rectilinear closed curve having some of the properties of an ellipse. In a symmetrical form, as used in this arrangement, the superellipse has a broadly rectilinear form in which each of the side edges blends smoothly into a corner and back to the following side edge. This arrangement is particularly suited to accommodating fluid flows because the continuously blended perimeter minimises aerodynamic losses at the perimeter of the superellipse.

In one such superellipse configuration the exponent n is 4. As the exponent n increases, the area enclosed within the superellipse increases, and the size of the corner radius decreases. The increase in enclosed area allows for an increased fluid flow through the shape defined by the superellipse, while the decrease in corner radius results in increased aerodynamic losses in the corner region. The inventors have discovered that a superellipse defined by the exponent n being equal to 4 provides for a balance between the increased flow area and the increased aerodynamic losses.

In alternative arrangements, the curved profile of each of the corner regions may be formed as a constant radius curve, a variable radius curve, an elliptical curve, a hyperbolic curve, or a logarithmic curve.

Optionally, each one of the four corner regions of the cross-sectional profile of the heat exchanger module accommodates one of the hollow vanes.

A further advantage of the square and superellipse geometrical forms for the cross-sectional profile of the heat exchanger module over a comparable circular form is that the radial length into the corner regions is greater than the radius of the equivalent circular cross-sectional profile of the heat exchanger module. This means that a longer heat transfer element may be accommodated along the radial length into the corner regions, which in turn enables the heat exchanger module of the present disclosure to have a higher heat transfer capacity than for a heat exchanger module having a circular cross-sectional profile.

Optionally, an airflow entering the heat exchanger module is divided between a set of vane airflows through each hollow vane, and a set of channel airflows through each channel, at least one of the hollow vanes accommodates at least one heat transfer element for the transfer of heat from a first fluid contained within the or each heat transfer element to the or each corresponding vane airflow passing over a surface of the or each heat transfer element.

In an arrangement according to the present disclosure, between 5% and 75% of the mass air flow entering the fan assembly will have passed through the hollow vanes and hence over a surface of the heat transfer elements. This range has been determined to be sufficient to provide the capability to reject operationally waste heat energy to the incoming air flow.

The parameter of mass air flow rate (typically expressed in kg/s) is well known to the skilled person, as is its measurement, and neither will be discussed further herein.

Optionally, the or each heat transfer element extends axially within the corresponding hollow vane.

By extending axially along an interior volume of the hollow vane, the heat transfer element can efficiently transfer heat energy to the incoming vane air flow without the need to force the incoming vane air flow to change direction. This makes the heat exchanger module of the present disclosure more aerodynamically efficient and thus more versatile and desirable for a user.

In alternative arrangements in which multiple heat transfer elements are positioned within a hollow vane, these heat transfer elements may be positioned side-by-side (i.e. circumferentially adjacent) or end-to end (i.e. axially adjacent). However, in each of these alternative arrangements, the individual heat transfer elements extend axially within the corresponding hollow vane.

Optionally, the fan diameter D is within the range of 0.3 m to 2.0 m, preferably within the range 0.4 m to 1.5 m, and more preferably in the range of 0.7 m to 1.0 m.

In one embodiment of the disclosure, the fan diameter is 0.9 m.

Consequently, for the same heat energy loading rejected to the air flow through the heat exchanger, the loss in propulsive efficiency of the turbofan engine is proportionately smaller for a large diameter (for example, approximately 1.5 to 2.0 m in diameter) turbofan engine than for a small diameter turbofan engine.

The fan tip diameter, measured across a centreline of the engine and between an outermost tip of opposing fan blades at their leading edge, may be in the range from 95 cm to 200 cm, for example in the range from 110 cm to 150 cm, or alternatively in the range from 155 cm to 200 cm. The fan tip diameter may be greater than any of: 110 cm, 115 cm, 120 cm, 125 cm, 130 cm, 135 cm, 140 cm, 145 cm, 150 cm, 155 cm, 160 cm, 165 cm, 170 cm, 175 cm, 180 cm, 185 cm, 190 cm or 195 cm. The fan tip diameter may be around 110 cm, 115 cm, 120 cm, 125 cm, 130 cm, 135 cm, 140 cm, 145 cm, 150 cm, 155 cm, 160 cm, 165 cm, 170 cm, 175 cm, 180 cm, 185 cm, 190 cm or 195 cm. The fan tip diameter may be greater than 160 cm.

The fan tip diameter may be in the range from 95 cm to 150 cm, optionally in the range from 110 cm to 150 cm, optionally in the range of from 110 cm to 145 cm, and further optionally in the range from 120 cm to 140 cm.

The fan tip diameter may be in the range from 155 cm to 200 cm, optionally in the range from 160 cm to 200 cm, and further optionally in the range from 165 cm to 190 cm.

Optionally, the heat exchanger module has a flow area $A_{HEX}$ and the fan module has a flow area $A_{FAN}$, and a ratio of $A_{FAN}$ to $A_{HEX}$ being in the range of 0.6 to 1.0.

The flow area is to be understood to mean a cross-sectional area of the air flow taken perpendicularly to a central axis of the flow in the flow direction. In other words, for the heat exchanger module the flow area $A_{HEX}$ corresponds to the cross-sectional area of the heat exchanger module through which the flow passes. Likewise, for the fan assembly the flow area $A_{FAN}$ corresponds to the cross-sectional area of the fan assembly through which the flow passes.

In one arrangement of the present disclosure, the flow area of the heat exchanger module has an annular profile and extends over only a radially outward circumferential portion of the flow area of the fan assembly. In other words, the air flow entering a radially proximal portion of the flow area of the fan assembly does not pass through the heat exchanger assembly and simply enters the fan assembly. In one arrangement, the radially outward circumferential portion of the flow area of the fan assembly amounts to 60% of the flow area of the fan assembly.

In another arrangement of the disclosure, the flow area of the heat exchanger module extends completely over the flow area of the fan assembly.

Optionally, the fan assembly has two or more fan stages, at least one of the fan stages comprising a plurality of fan blades defining the fan diameter D.

In one arrangement, the fan assembly has two fan stages with both fan stages comprising a plurality of fan blades defining the same fan diameter. Alternatively, each of the fan stages may have different fan diameters.

Optionally, in use, an airflow entering the heat exchanger module with a mean velocity of 0.4 M, is divided between the set of vane airflows having a mean velocity of 0.2 M, and the set of channel airflows having a mean velocity of 0.6 M.

In one arrangement of the present disclosure, the inlet and exhaust portions of the hollow vane may act as a diffuser to slow the air flow entering the hollow vane. In other words, the vane mass air flow is reduced from the mass air flow of the air flow entering the heat exchanger module. In this arrangement, the channel air flow through the channels between circumferentially adjacent pairs of hollow vanes is increased to maintain continuity of flow.

According to another aspect of the present disclosure there is provided a method of operating an aircraft comprising the gas turbine engine according to the first embodiment, the method comprising taking off from a runway, wherein the maximum rotational speed of the turbine during take-off is in the range of from 12400 rpm to 24700 rpm.

The maximum take-off rotational fan speed may be in a range between 12400 rpm to 24700 rpm. Optionally, for example for an engine with a fan tip diameter in the range from 50 cm to 80 cm, the maximum take-off rotational fan speed may be in a range between 12400 rpm to 20500 rpm. Optionally, for example for an engine with a fan tip diameter in the range from 70 cm to 100 cm, the maximum take-off rotational fan speed may be in a range between 10000 rpm to 15000 rpm.

According to another aspect of the present disclosure there is provided a method of operating a turbofan gas turbine engine, the gas turbine engine comprising, in axial flow sequence, a heat exchanger module, an inlet duct, a fan assembly, a compressor module, and a turbine module, and an exhaust module, the fan assembly comprising a plurality of fan blades defining a fan diameter (D), and wherein the method comprises the steps of:
 (i) providing the fan assembly, the compressor module, and the turbine module, and the exhaust module;
 (ii) providing the heat exchanger module with a square axial cross-sectional profile, where a side length of the square cross-section is D;
 (iii) positioning the heat exchanger module in fluid communication with the fan assembly by the inlet duct;
 (iii) providing the heat exchanger module with a plurality of radially-extending hollow vanes arranged in a circumferential array with a channel extending axially between each pair of adjacent hollow vanes, at least one of the hollow vanes accommodating at least one heat transfer element for the transfer of heat energy from a first fluid contained within the or each heat transfer element to a corresponding vane airflow through the or each hollow vane and over a surface of the or each heat transfer element; and
 (iv) operating the gas turbine engine such that an airflow entering the heat exchange module is divided between the set of vane airflows through each hollow vane, and a set of channel airflows through each channel.

In the turbofan gas turbine engine of the present arrangement, the intake air entering the fan assembly must first pass through the heat exchanger module. The presence of the circumferential array of radially extending vanes in the heat exchanger module results in a pressure drop across the heat exchanger module. This in turn restricts the intake air flow entering the turbofan gas turbine engine via the fan assembly and as an adverse effect on the performance of the engine.

Providing the heat exchanger module with a square axial cross-sectional profile increases the area across which the intake air passes and so reduces the pressure drop across the heat exchanger module. This improves the performance of the engine relative to the configuration having a heat exchanger module with a circular cross-sectional profile.

Optionally, step (ii) comprises the step of:
 (ii)' providing the heat exchanger module with a square axial cross-sectional profile in which each corner comprises each corner of the cross-sectional profile comprises a curved profile.

In one arrangement, the axial cross-sectional profile takes the form of a super ellipse defined by $$x = \sqrt[n]{R^n - y^n}$$

where: x and y are cartesian co-ordinates for a point on the super ellipse;

R is the half-side length of the axial cross-sectional profile (i.e. R=E/2); and n lies in the range of between 2 and 10.

The superellipse is a broadly rectilinear closed curve having some of the properties of an ellipse. In a symmetrical form, as used in this arrangement, the superellipse has a broadly rectilinear form in which each of the side edges blends smoothly into a corner and back to the following side edge. This arrangement is particularly suited to accommodating fluid flows because the continuously blended perimeter minimises aerodynamic losses at the perimeter of the superellipse.

In one such superellipse configuration, the exponent n is 4. As the exponent n increases, the area enclosed within the superellipse increases, and the size of the corner radius decreases. The increase in enclosed area allows for an increased fluid flow through the shape defined by the superellipse, while the decrease in corner radius results in increased aerodynamic losses in the corner region. The inventor has discovered that a superellipse defined by the exponent n being equal to 4 provides for an optimum balance between the increased flow area and the increased aerodynamic losses.

Optionally, the turbofan gas turbine engine further comprises an outer housing, the outer housing enclosing the sequential arrangement of heat exchanger module, fan assembly, compressor module, and turbine module, an annular bypass duct being defined between the outer housing and the sequential arrangement of modules, a bypass ratio being defined as a ratio of a mass air flow rate through the bypass duct to a mass air flow rate through the sequential arrangement of modules, and wherein the bypass ratio is less than 2.0.

A turbofan engine having a bypass ratio (BPR) of less than approximately 2.0 will have a generally smaller bypass duct (the annular duct surrounding the core gas turbine engine) than a turbofan engine having a BPR greater than approximately 2.0. For a turbofan engine with a BPR greater than, say, 2.0, the correspondingly larger bypass duct volume provides more scope for positioning a heat exchanger within the bypass duct than would be the case for a low BPR turbofan engine.

The skilled person will appreciate that a feature described above in relation to any one of the aspects may be applied, mutatis mutandis, to any other aspect of the invention. For example, in various embodiments any two or more of the conditions for ratios as defined above, and optionally all specified ratio ranges, may apply to any given aspect or embodiment. All aspects may apply to an engine of some embodiments. Furthermore, any feature described below may apply to any aspect and/or may apply in combination with any one of the claims.

As noted elsewhere herein, the present disclosure may relate to a turbofan gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core. The fan may comprise any number of stages, for example multiple stages. Each fan stage may comprise a row of fan blades and a row of stator vanes. The stator vanes may be variable stator vanes (in that their angle of incidence may be variable).

The turbofan gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any turbofan gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of compressor stages, for example multiple stages. Each compressor stage may comprise a row of rotor blades and a row of stator vanes. The stator vanes may be variable stator vanes (in that their angle of incidence may be variable). The row of rotor blades and the row of stator vanes may be axially offset from each other.

The or each turbine (for example the first turbine and second turbine as described above) may comprise any number of turbine stages, for example multiple stages. Each turbine stage may comprise a row of rotor blades and a row of stator vanes.

The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.40, 0.39, 0.38, 0.37, 0.36, 0.35, 0.34, 0.33, 0.32, 0.31, 0.30, 0.29, 0.28, 0.27, or 0.26. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 50 cm, 60 cm, 70 cm (around 27.5 inches), 80 cm (around 31.5 inches), 90 cm, 100 cm (around 39 inches), 110 cm (around 43 inches), 120 cm (around 47 inches), 130 cm (around 51 inches), 140 cm (around 55 inches), 150 cm (around 59 inches), or 160 cm (around 130 inches). The fan diameter may be in an inclusive range bounded by any two of the values in the previous sentence (i.e. the values may form upper or lower bounds), for example in the range of from 50 cm to 70 cm or 90 cm to 130 cm.

The fan face area may be calculated as $\pi$ multiplied by the square of the fan tip radius.

The rotational speed of the fan may vary in use. Generally, the rotational speed is lower for fans with a higher diameter. Purely by way of non-limitative example, the rotational speed of the fan at cruise conditions may be less than 10000 rpm, for example less than 9000 rpm. Purely by way of further non-limitative example, the rotational speed of the fan at cruise conditions for an engine having a fan diameter in the range of from 50 cm to 90 cm (for example 60 cm to 80 cm or 65 cm to 75 cm) may be in the range of from 7000 rpm to 22000 rpm, for example in the range of from 7000 rpm to 16000 rpm, for example in the range of from 7500 rpm to 14000 rpm. Purely by way of further non-limitative example, the rotational speed of the fan at cruise conditions for an engine having a fan diameter in the range of from 90 cm to 150 cm may be in the range of from 4500 rpm to 12500 rpm, for example in the range of from 4500 rpm to 10000 rpm, for example in the range of from 6000 rpm to 10000 rpm.

In use of the turbofan gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.22, 0.23, 0.24, 0.25, 0.26, 0.27, 0.28, 0.29, 0.30, 0.31, 0.32, 0.33, 0.34, 0.35, 0.36, 0.37, 0.38, 0.39 or 0.40 (all values being dimensionless). The fan tip loading may be in an inclusive range bounded by any two of the values in the previous sentence (i.e. the values may form upper or lower bounds), for example in the range of from 0.28 to 0.31, or 0.29 to 0.30.

Turbofan gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 0.4, 0.5, 0.6, 0.7, 0.8, 0.9, 1.0, 1.1, 1.2, 1.3, 1.4, or 1.5. The bypass ratio may be in an inclusive range bounded by any two of the values in the previous sentence (i.e. the values may form upper or lower bounds), for example in the range of form of 0.4 to 1.0, 0.5 to 0.9, or 0.6 to 0.9. The bypass duct may be substantially annular. The bypass duct may be radially outside the core engine. The radially outer surface of the bypass duct may be defined by a nacelle and/or a fan case.

The overall pressure ratio of a turbofan gas turbine engine as described and/or claimed herein may be defined as the ratio of the stagnation pressure upstream of the fan to the stagnation pressure at the exit of the highest-pressure compressor (before entry into the combustor). By way of non-limitative example, the overall pressure ratio of a gas turbine engine as described and/or claimed herein at cruise may be greater than (or on the order of) any of the following: 10, 15, 20, 25, 30, 35 or 40. The overall pressure ratio may be in an inclusive range bounded by any two of the values in the previous sentence (i.e. the values may form upper or lower bounds), for example in the range of from 20 to 35.

A turbofan gas turbine engine as described and/or claimed herein may have any desired maximum thrust. Purely by way of non-limitative example, a gas turbine as described and/or claimed herein may be capable of producing a maximum thrust of at least (or on the order of) any of the following: 20 kN, 40 kN, 60 kN, 80 kN, 100 kN, 120 kN, 140 kN, 160 kN, 180 kN, or 200 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 60 kN to 160 kN, for example 70 kN to 120 kN. The thrust referred to above may be the maximum net thrust at standard atmospheric conditions at sea level plus 15 degrees C. (ambient pressure 101.3 kPa, temperature 30 degrees C.), with the engine static.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium-based metal or an aluminium-based material (such as an aluminium-lithium alloy) or a steel-based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The turbofan gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a turbofan gas turbine engine as described and/or claimed herein may have any desired number of fan blades, for example 12, 14, 16, 18, 20, 22, 24, 26, 28, 30, 32, 34, or 36 fan blades.

According to an aspect of the disclosure, there is provided an aircraft comprising a turbofan gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect of the disclosure, there is provided a method of operating a turbofan gas turbine engine as described and/or claimed herein. The operation may be at the cruise conditions as defined elsewhere herein (for example in terms of the thrust, atmospheric conditions and Mach Number).

According to an aspect of the disclosure, there is provided a method of operating an aircraft comprising a turbofan gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
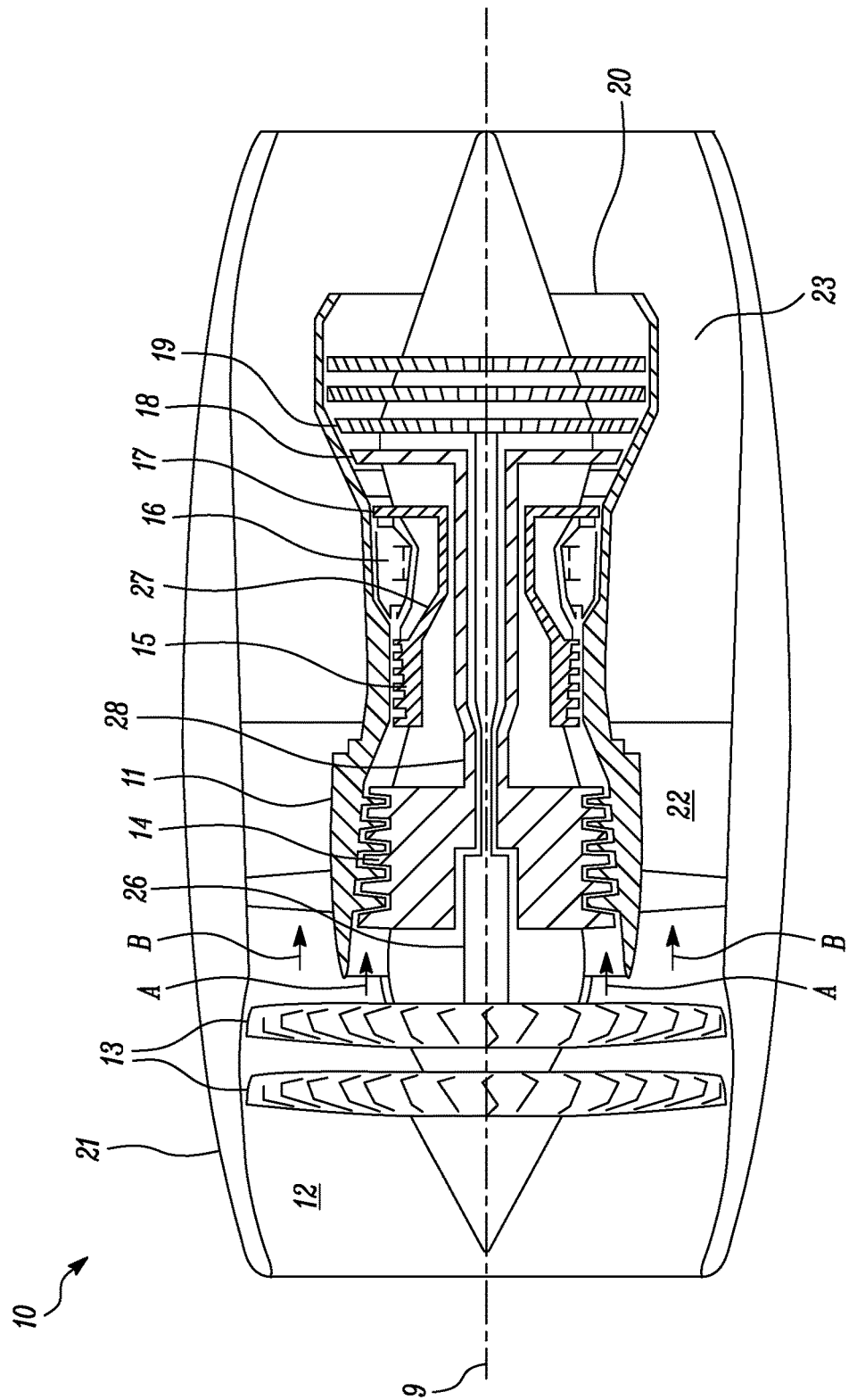
FIG. 1 shows a schematic part-sectional view of a turbofan gas turbine engine according to the prior art.

FIG. 1 illustrates a conventional turbofan gas turbine engine 10 having a principal rotational axis 9. The engine 10 comprises an air intake 12 and a two-stage propulsive fan 13 that generates two airflows: a core airflow A and a bypass airflow B. The gas turbine engine 10 comprises a core 11 that receives the core airflow A. The engine core 11 comprises, in axial flow series, a low-pressure compressor 14, a high-pressure compressor 15, combustion equipment 16, a high-pressure turbine 17, an intermediate-pressure turbine 18, a low-pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 13 is attached to and driven by the low-pressure turbine 19 via a shaft 26.

In use, the core airflow A is accelerated and compressed by the low-pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high-pressure, intermediate-pressure, and low-pressure turbines 17, 18, 19 before being exhausted through the nozzle 20 to provide some propulsive thrust. The high-pressure turbine 17 drives the high-pressure compressor 15 by a suitable interconnecting shaft 27. The low-pressure compressor 14 drives the intermediate-pressure turbine 18 via a shaft 28.

Note that the terms "low-pressure turbine" and "low-pressure compressor" as used herein may be taken to mean the lowest pressure turbine stages and lowest pressure compressor stages (i.e. not including the fan 13) respectively and/or the turbine and compressor stages that are connected together by the interconnecting shaft 26 with the lowest rotational speed in the engine. In some literature, the "low-pressure turbine" and "low-pressure compressor" referred to herein may alternatively be known as the "intermediate-pressure turbine" and "intermediate-pressure compressor". Where such alternative nomenclature is used, the fan 13 may be referred to as a first, or lowest pressure, compression stage.

Other turbofan gas turbine engines to which the present disclosure may be applied may have alternative configurations. For example, such engines may have an alternative number of fans and/or compressors and/or turbines and/or an alternative number of interconnecting shafts. By way of further example, the gas turbine engine shown in FIG. 1 has a split flow nozzle 20, 23 meaning that the flow through the bypass duct 22 has its own nozzle 23 that is separate to and radially outside the core engine nozzle 20. However, this is not limiting, and any aspect of the present disclosure may also apply to engines in which the flow through the bypass duct 22 and the flow through the core engine 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the turbofan gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 2:
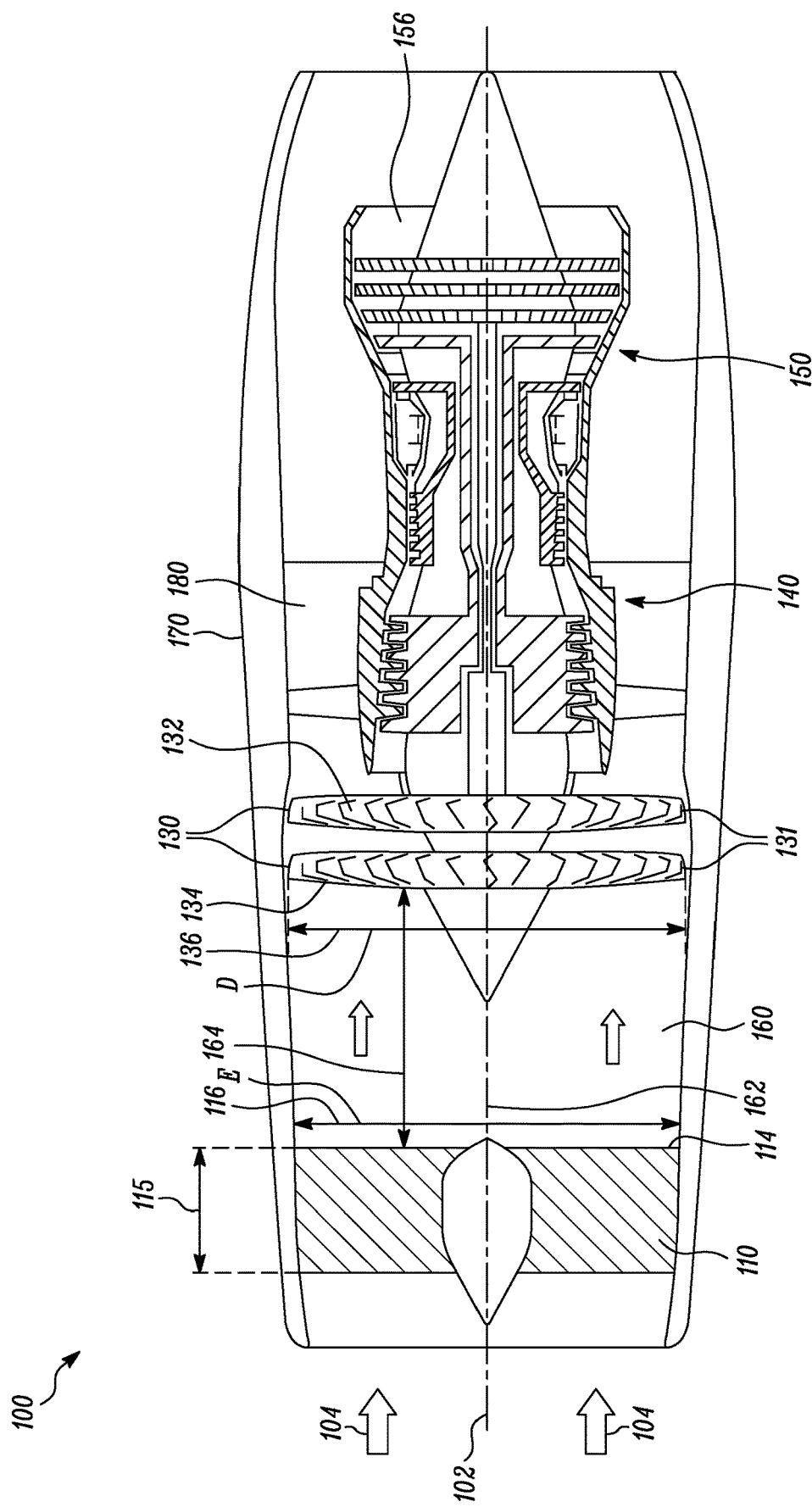
FIG. 2 shows a schematic part-sectional view of a turbofan gas turbine engine according to a first embodiment of the disclosure.

Referring to FIG. 2, a turbofan gas turbine engine having an inlet heat exchanger is designated generally by the reference numeral 100. The turbofan gas turbine engine 100 comprises in axial flow sequence, a heat exchanger module 110, a fan assembly 130, a compressor module 140, a turbine module 150, and an exhaust module 156.

In this arrangement, the fan assembly 130 comprises two fan stages 131, with each fan stage 131 comprising a plurality of fan blades 132. In the present arrangement each fan stage 131 has the same fan diameter 136, with the respective plurality of fan blades defining a fan diameter of 0.9 m. In an alternative arrangement, the two fan stages 131 may have different fan diameters 136 each defined by the corresponding plurality of fan blades 132. As previously mentioned, the fan diameter (D) 136 is defined by a circle circumscribed by the leading edges of the respective plurality of fan blades 132.

Figure 3:
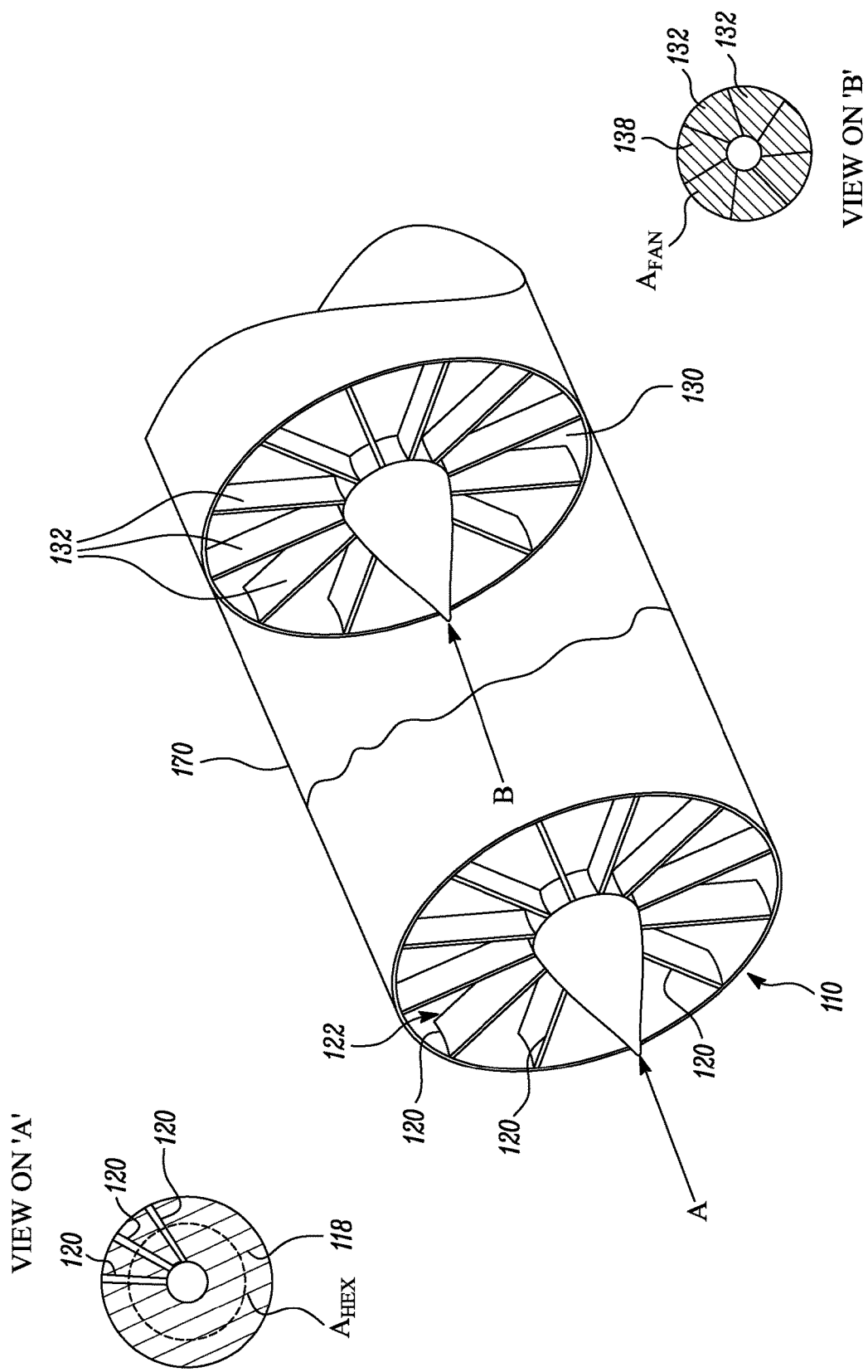
FIG. 3 shows a perspective schematic view of the heat exchanger module of the turbofan engine of FIG. 2 showing the circumferential array of vanes forming the heat exchanger module.

FIG. 3 shows a perspective view of the heat exchanger module 110 and fan assembly 130 of the turbofan gas turbine engine 100. The heat exchanger module 110 comprises twelve radially extending vanes 120 arranged in an equi-spaced circumferential array 122 with a channel 124 extending axially between each pair of adjacent hollow vanes 120. Alternative embodiments may have more or fewer radially extending vanes 120.

Figure 9:
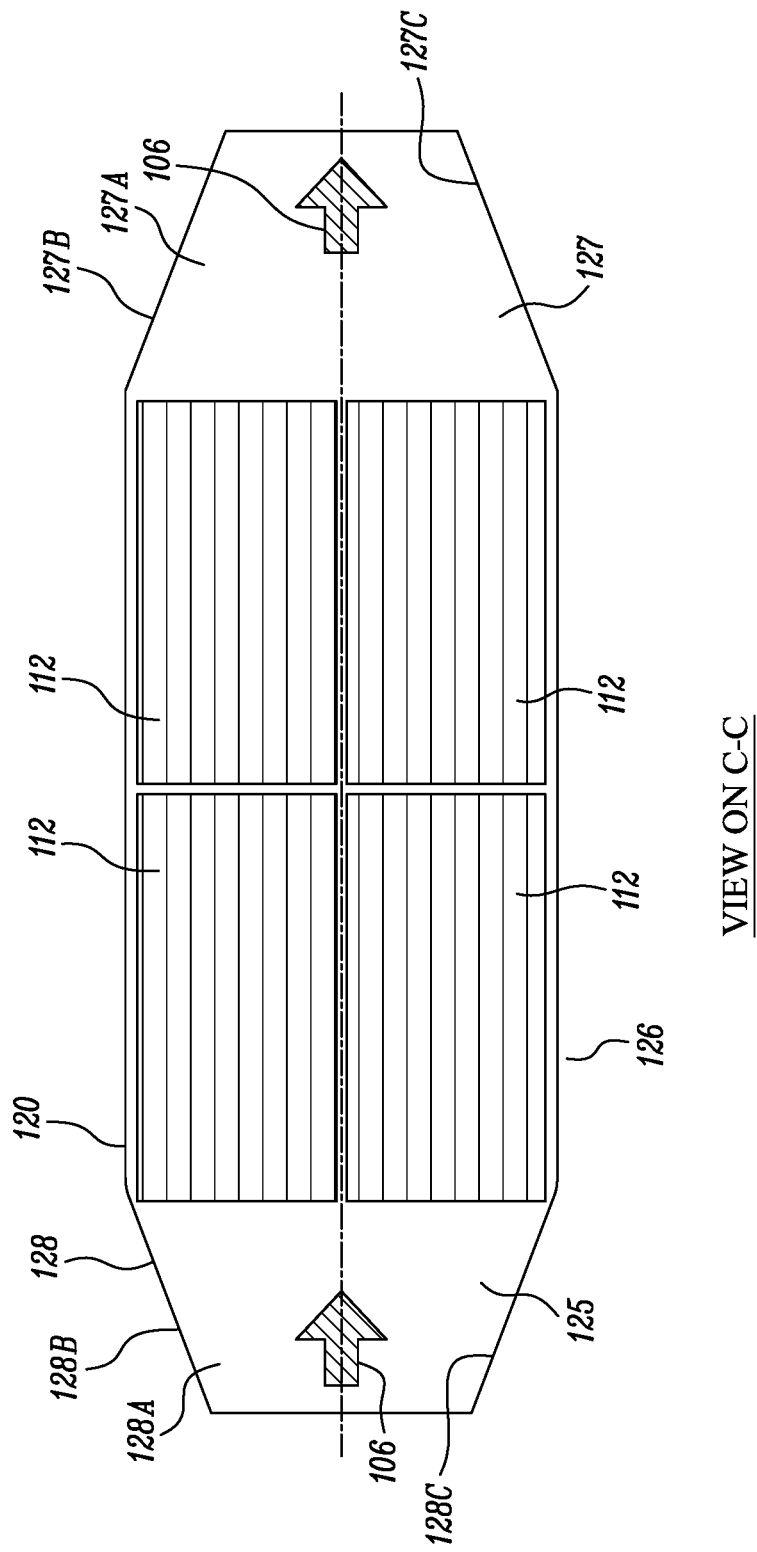
FIG. 9 shows a schematic axial sectional view across one of the vanes of the vane array of the heat exchanger module of FIG. 3.

Each of the vanes 120 is hollow and comprises four heat transfer elements 112 arranged in a 2×2 configuration extending axially along the hollow interior of the vane 120, as shown in FIG. 9. Alternative embodiments may not have a heat transfer element 112 within each vane 120 or may have a different number of heat transfer elements 112 in any single vane 120.

Each of the heat transfer elements 112 has a corresponding swept area, which is the area of the heat transfer element 112 that is contacted by the air flow 104. In the present arrangement, the total swept heat transfer element area ($A_{HTE}$) is the sum of the swept area of each of the individual heat transfer elements 112.

Each vane 120 is configured to allow the incoming airflow 104 passing through the heat exchange module 110 to pass through the hollow portion of the vane 120 and thence to flow over the respective heat transfer element 112. In this way heat energy is transferred from the first fluid 190 to the air flow 104.

Figure 4:
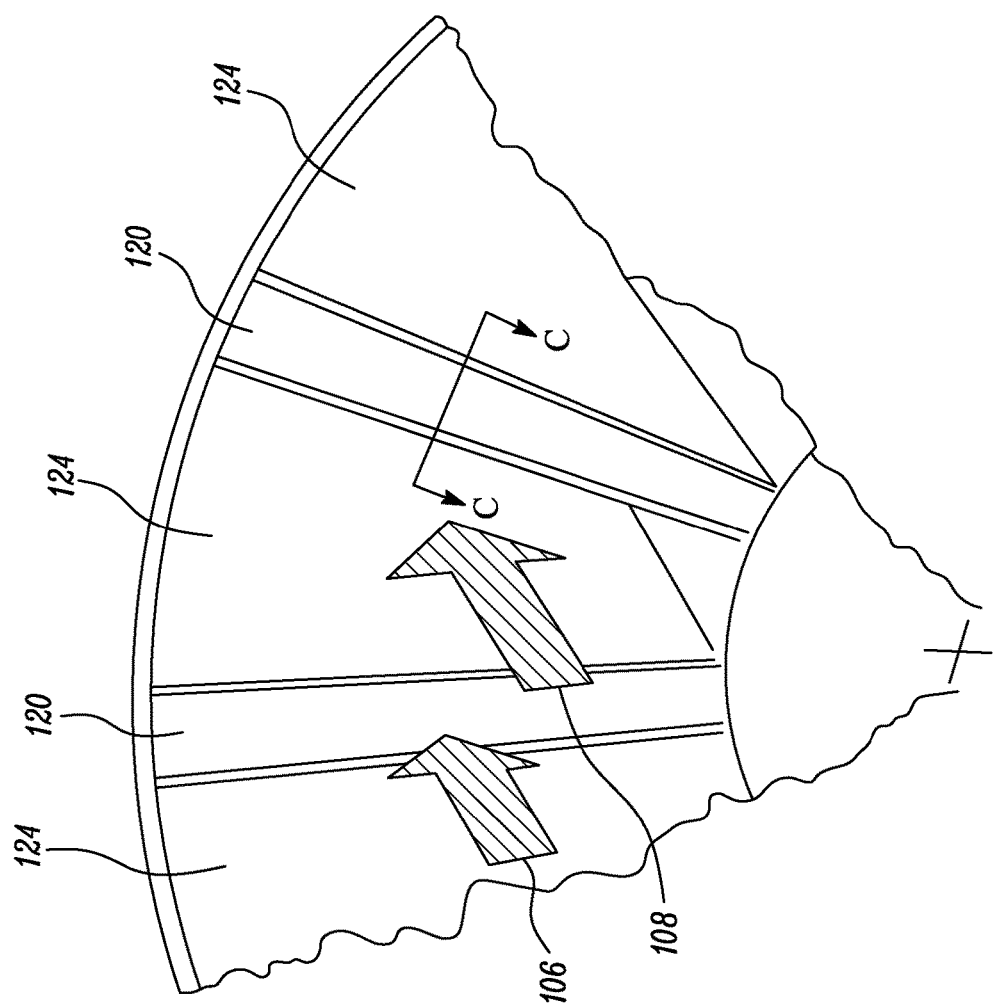
FIG. 4 shows a schematic part-sectional view of a part of the vane array of the heat exchanger module of FIG. 3.

In use, as illustrated in FIG. 4, an airflow 104 entering the heat exchanger module 110 is divided between a set of vane airflows 106 through each of the hollow vanes 120 and a set of channel airflows 108 through each of the channels 124. Each of the vane airflows 106 has a vane mass flowrate $Flow_{Vane}$. Each of the channel airflows 108 has a channel mass flowrate $Flow_{Chan}$.

A Vane Airflow Ratio parameter $V_{AR}$ is defined as:

$$VAR = \frac{Flow_{VaneTot}}{Flow_{ChanTot}}$$

where: $Flow_{VaneTot}$=total mass flow rate of the vane mass flow rates, $Flow_{Vane}$; and $Flow_{ChanTot}$=total mass flow rate of the channel mass flow rates, $Flow_{Chan}$ In the present embodiment, the VAR parameter is 1.0. In other words, in this arrangement the incoming airflow 104 is divided equally between the vane airflows 106 and the channel airflows 108.

Figures 5A, 5B, 5C, 5D:
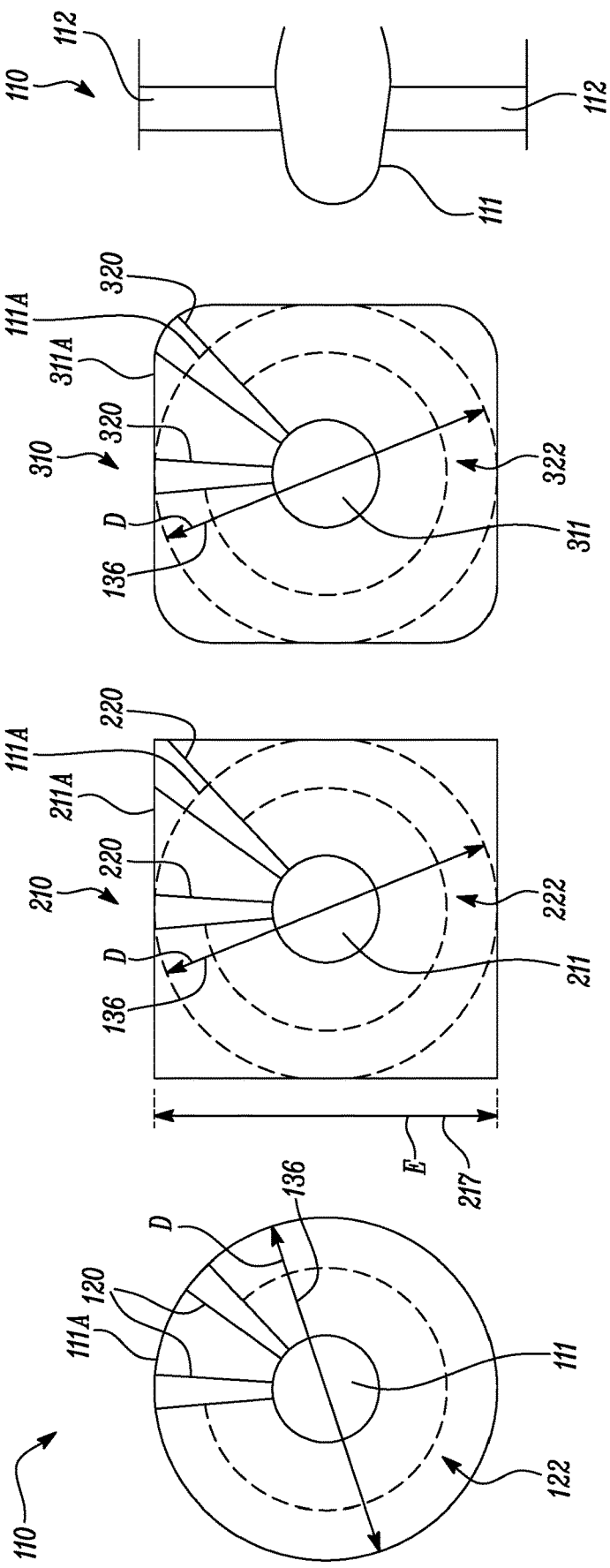
FIG. 5A shows a schematic axial view of a heat exchanger assembly having a circular cross-section.
FIG. 5B shows a schematic axial view of a heat exchanger assembly having a sharp square cross-section.
FIG. 5C shows a schematic axial view of a heat exchanger assembly having a radiussed square cross-section.
FIG. 5D shows a schematic sectional view of the heat exchanger assemblies of FIGS. 5A, 5B and 5C.

FIG. 5A shows a schematic end view of the heat exchanger module 110. In this arrangement, a plurality of radially extending vanes 112 are positioned in a circumferential array.122. The heat exchanger module 110 has a circular cross-sectional profile 111A with an outer diameter equal to the fan diameter D represented by reference numeral 136.

A heat exchanger module 210 according to a first embodiment of the disclosure is illustrated in FIG. 5B. In this embodiment, the heat exchanger module 210 has a square axial cross-sectional profile 211A, in which a side length 217 of the square cross-sectional profile 211A is represented as E.

As shown in FIG. 5B, in this embodiment, the side length 217 of the square cross-sectional profile 211A is equal to the fan diameter 136. In other words, in this arrangement, E equals to D. In other arrangements, E may be larger or smaller than D.

FIG. 5C shows a heat exchanger module 310 according to a second embodiment of the present disclosure. In this second embodiment, the heat exchanger module 310 has a cross-sectional profile 311A in the form of a superellipse. The superellipse is defined by the following equation.

$$x = \sqrt[n]{R^n - y^n}$$

where: x and y are cartesian co-ordinates for a point on the superellipse;

R is the half-side length of the axial cross-sectional profile (i.e. R=E/2); and n lies in the range of between 2 and 10.

Figure 7:
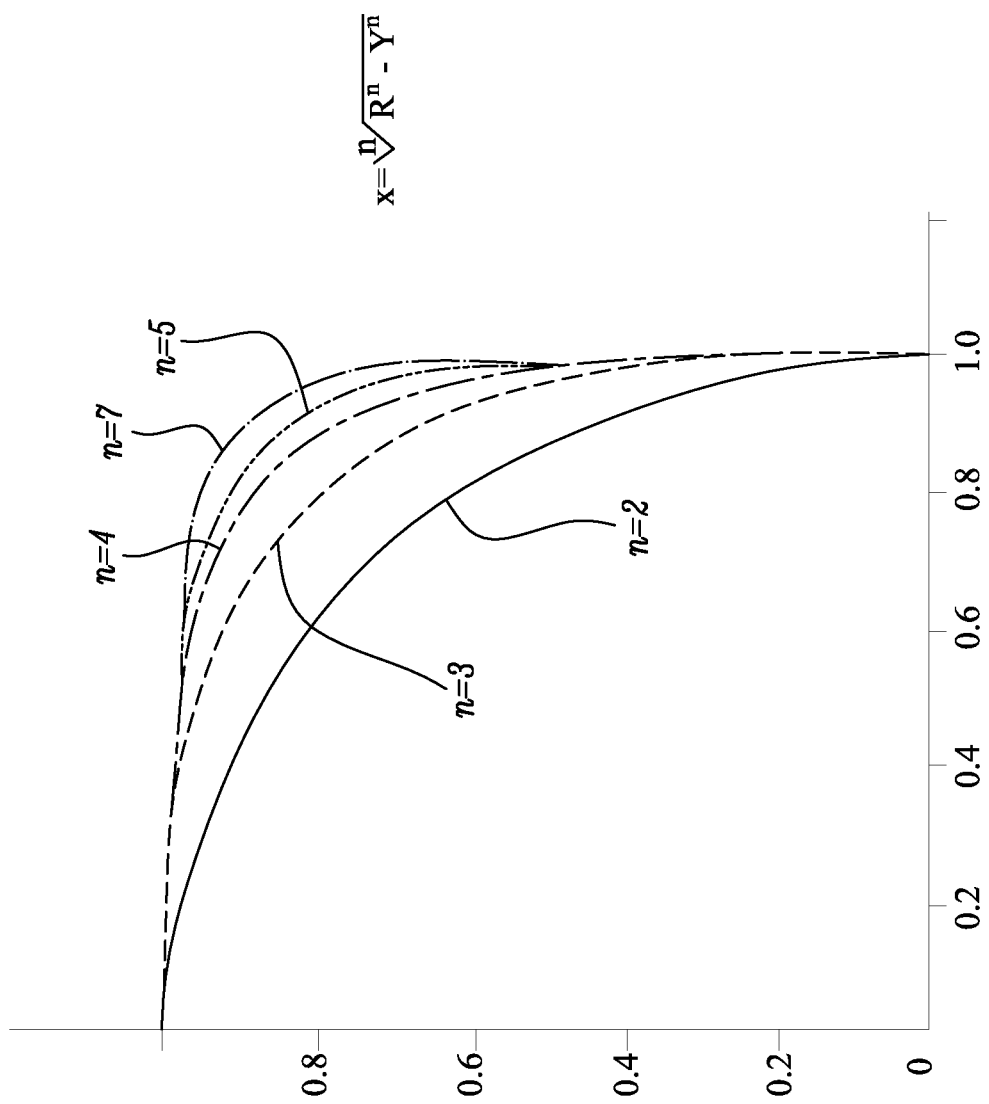
FIG. 7 shows the variation in corner radius for the heat exchanger assembly of FIG. 5C.

In this embodiment, the exponent n is 4. In other arrangements, the exponent n may be greater than 4 or may be smaller than 4. Variation in the exponent n will change the form of the radiussed corner region. FIG. 7 shows the variation in corner profile for superellipses in which the exponent n is 2, 3, 4, 5, or 7.

As illustrated in FIG. 5C, a radially-extending vane 320 is positioned at each of the four corners of the cross-sectional profile 311A. Further radially-extending vanes 320 are positioned between these 'corner' vanes 320 to form a circumferential array 322 of vanes 320.

Figure 6:
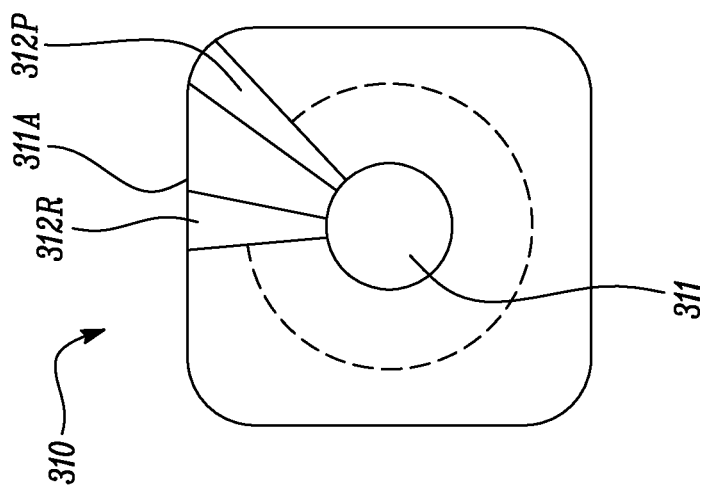
FIG. 6 shows a schematic axial view of the heat exchanger assembly of FIG. 5C showing the alternating arrangement of corner and edge heat transfer elements.

This is further illustrated in FIG. 6, which shows the four 'corner' vanes 320P, extending radially outwardly from the central hub 311. Each of the 'corner' vanes 320P comprises at least one corresponding heat transfer element 312P. Between each pair of 'corner' vanes 320P is positioned a corresponding 'edge' vane 320R. Each of the 'edge' vanes 320R comprises a corresponding heat transfer element 312R.

FIG. 5D shows a schematic sectional view through the heat exchanger modules 110,210,310 showing how the vanes 120 and associated heat transfer elements 112,212,312 extend radially outwardly from a central hub 111.

Figure 8:
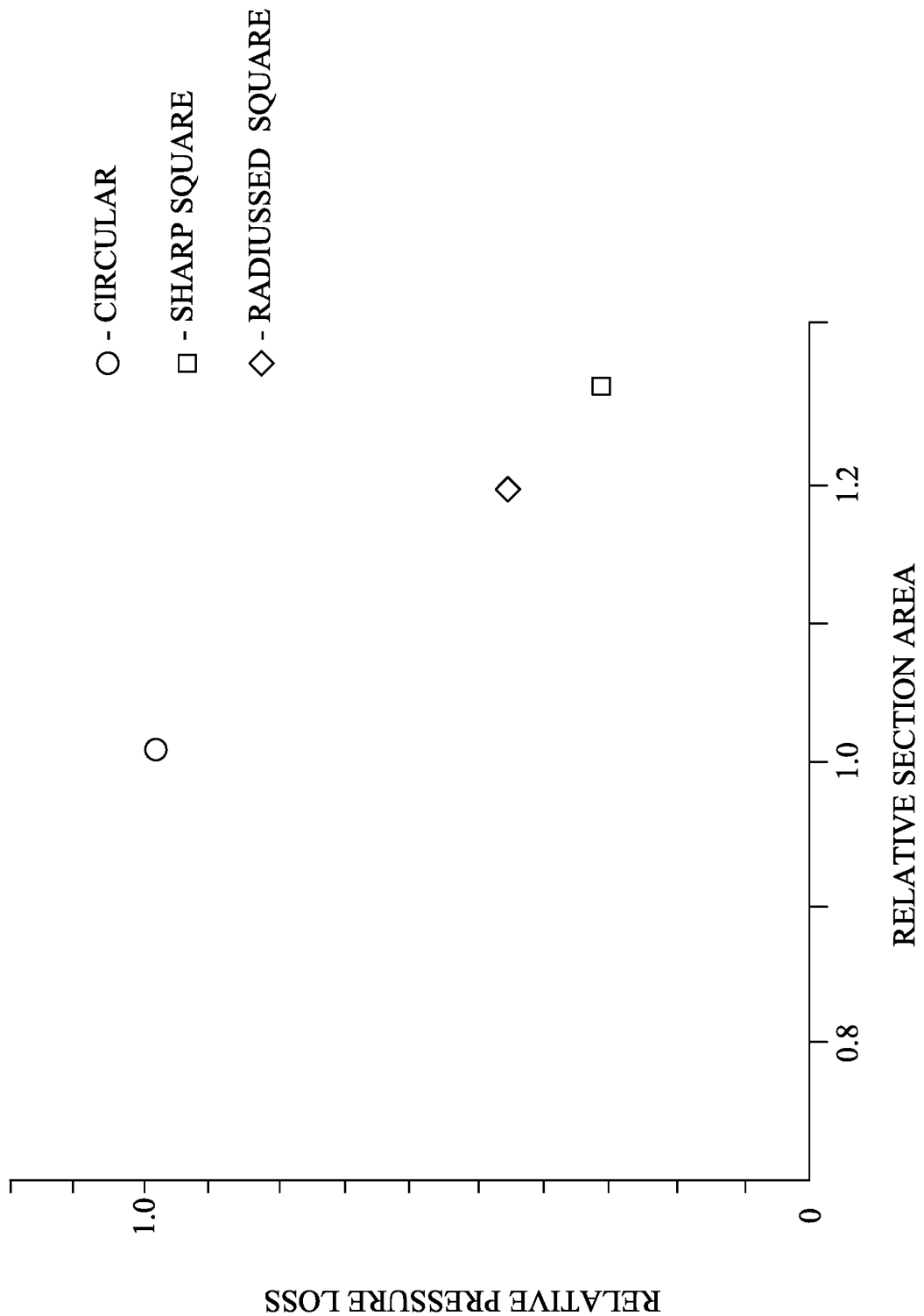
FIG. 8 shows the change in pressure loss through the heat exchanger assembly for the heat exchanger assemblies of FIGS. 5A (circular), 5B (sharp square) and 5C (radiussed square)

FIG. 8 shows the reduction in pressure drop across the heat exchanger module 110,210,310 that is obtained by the change from the circular cross-sectional profile of the heat exchanger module 110, to the square cross-sectional profile of the heat exchanger module 210, and then to the superellipse cross-sectional profile of the heat exchanger module 2103.

FIG. 9 shows an axial cross-section through one of the hollow vanes 120 and corresponds to the Section on 'C-C' from FIG. 4. Each of the hollow vanes 120 comprises, in axial flow sequence, an inlet portion 125, a heat transfer portion 126, and an exhaust portion 127.

The inlet portion 125 comprises a diffuser element 128. The diffuser element 128 takes the form of an axially-extending first duct 128A. The first duct 128A has an axial cross-section 128B that has a linearly divergent profile 128C. In use, the diffuser element 128 acts to slow the incoming airflow 104 to the vane airflow 106. The diffuser element 128 is sized such that the vane mass flow rate $Flow_{Vane}$ is less than the channel mass flow rate $Flow_{Chan}$ by a user-defined margin.

The heat transfer portion 126 accommodates the heat transfer elements 112. Finally, the exhaust portion 127 comprises an axially-extending second duct 127A having an axial cross-section 127B that in turn has a linearly convergent profile 127C.

Figure 10:
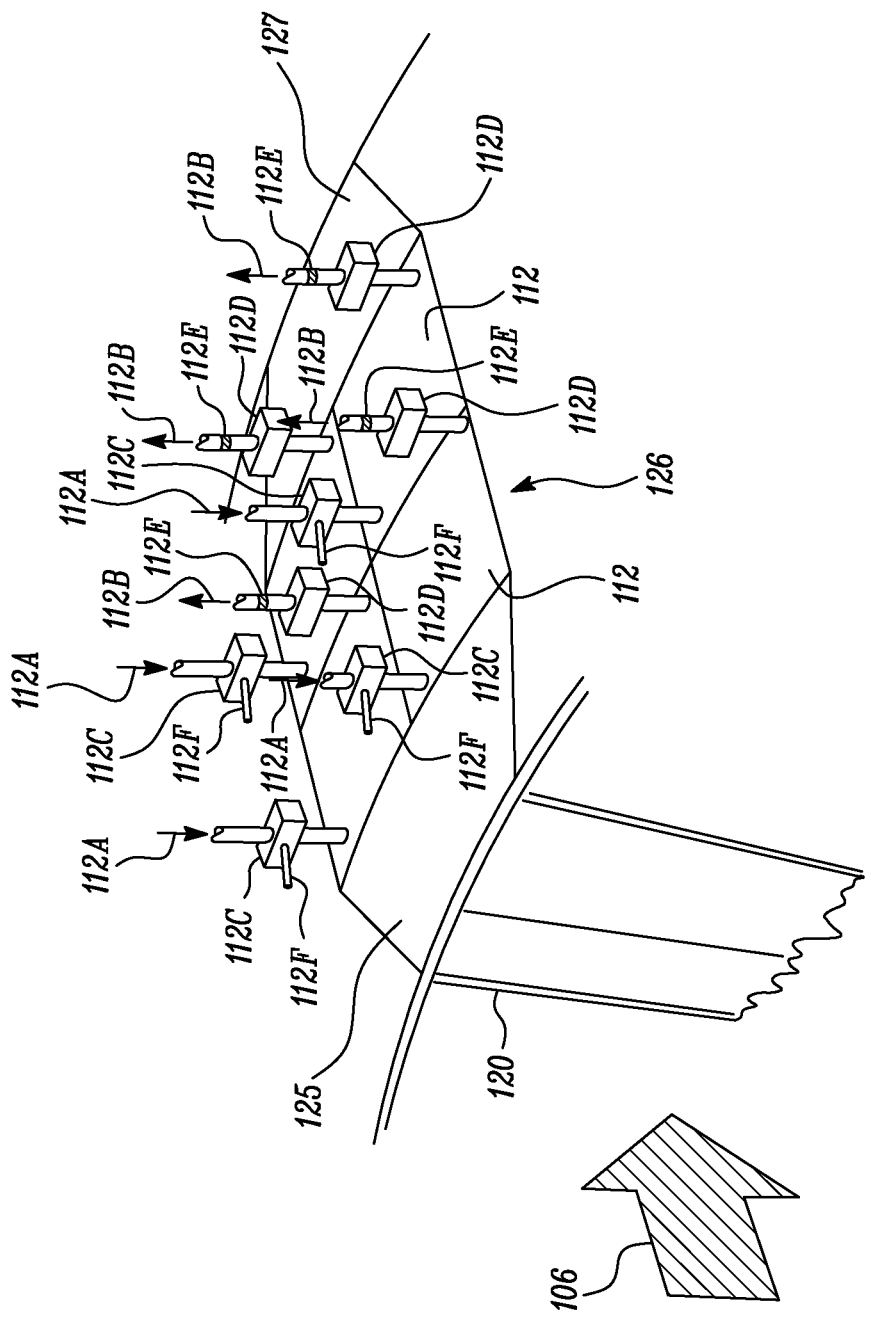
FIG. 10 shows a perspective schematic view of a heat transfer element of the heat exchanger module of FIG. 3.

FIG. 10 shows a perspective schematic view of a radially outward facing surface of a hollow vane 120. As outlined above, in this embodiment each vane is provided with four heat transfer elements 112 arranged in a 2×2 formation. Each of the heat transfer elements 112 has a fluid inlet 112A and a corresponding fluid outlet 112B. The fluid inlet 112A provides a feed of hot oil (not shown) to the respective heat transfer element 112. Each of the fluid inlets 112A is provided with an actuatable inlet valve 112C that can be switched to cut off the fluid flow into the heat transfer element 112. Additionally, each of the fluid outlets 112B is provided with an actuatable inlet valve 112D that can also be controlled to cut off the fluid flow leaving the heat transfer element 112.

Each of the fluid inlet valves 112C is provided with a fluid pressure sensor 112F that monitors the pressure of the oil flowing through the inlet 112A. In response to a sensed drop in the fluid pressure as measured by the pressure sensor 112F, the inlet valve 112C may be actuated to cut-off the oil flow through the respective heat transfer element 112. In this arrangement, the outlet valve 112D is also actuated in response to a loss of oil pressure to thereby isolate the corresponding heat transfer element 112 from the remaining oil flow.

Each of the fluid outlets 112B is provided with a fluid flow sensor 112E. In the event of a drop in fluid flow rate as detected by the flow sensor 112E, the corresponding fluid outlet valve 112D (and in this arrangement, the corresponding fluid inlet valve 112C) can be actuated to cut off the oil flow through the heat transfer element 112.

In addition to, or in an alternative to, the diffuser element 128 described above, the hollow vane 120 may be provided with a flow modulator 120A. The flow modulator 120A is configured to actively regulate the vane airflow 106 as a proportion of a total airflow 104 entering the heat exchanger module 110 in response to a user requirement. In other words, the flow modulator 120A provides a user with the ability to actively change the vane mass flowrate $Flow_{VaneTot}$ as a proportion of the airflow 104 entering the turbofan engine.

Figure 11A:
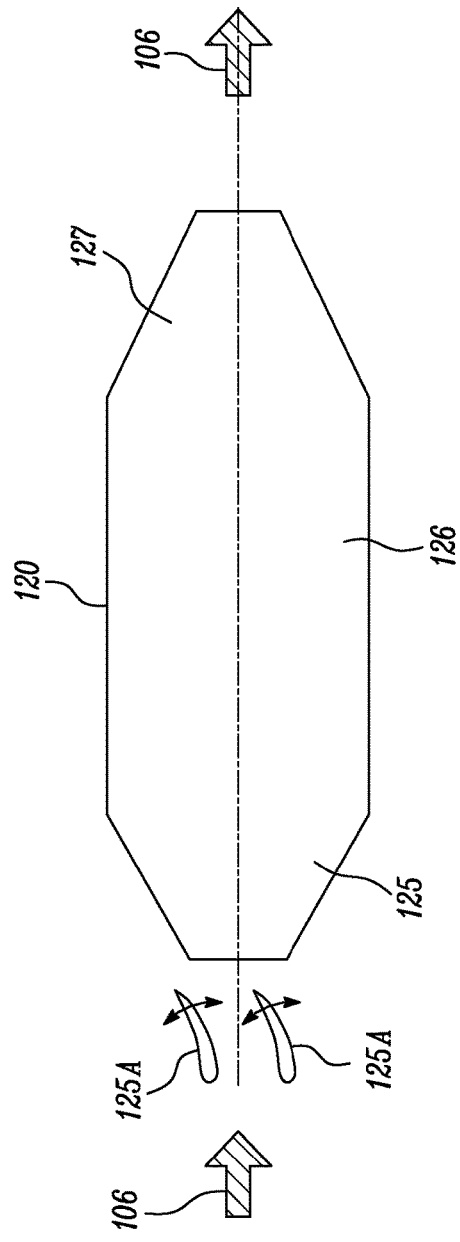
FIG. 11A shows a schematic view of the vane of FIG. 9 with a flow modulator in the form of first vanes arranged upstream of the inlet to the vane.

In one arrangement, shown in FIG. 11A, the flow modulator 120A takes the form of first vanes 125A positioned upstream of the inlet portion 125 of the hollow vane 120. The first vanes 125A are actuatable to restrict the vane airflow 106 in response to the user requirement to change the ratio of the mass airflows between the hollow vane and the channel.

The first vanes 125A also provide a measure of protection to the heat transfer elements 112 positioned inside the hollow vane 120 from foreign object damage caused by debris or other objects entering the hollow vane 120.

Figure 11B:
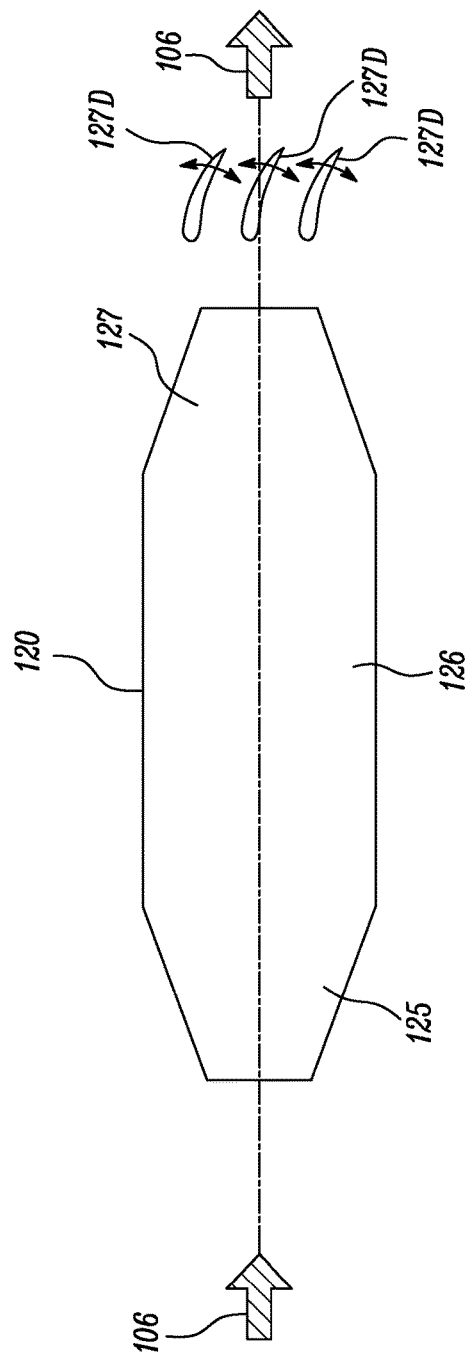
FIG. 11B; shows a schematic view of the vane of FIG. 9 with a flow modulator in the form of second vanes arranged downstream of the exhaust from the vane.

FIG. 11B illustrates an alternative arrangement for the flow modulator 120A in which second vanes 127D are positioned downstream of the exhaust portion 127 of the hollow vane 120. These second vanes 127D are actuatable to restrict the vane airflow 106 in response to the user requirement to change the ratio of the mass airflows between the hollow vane 120 and the channel 124.

Figure 11C:
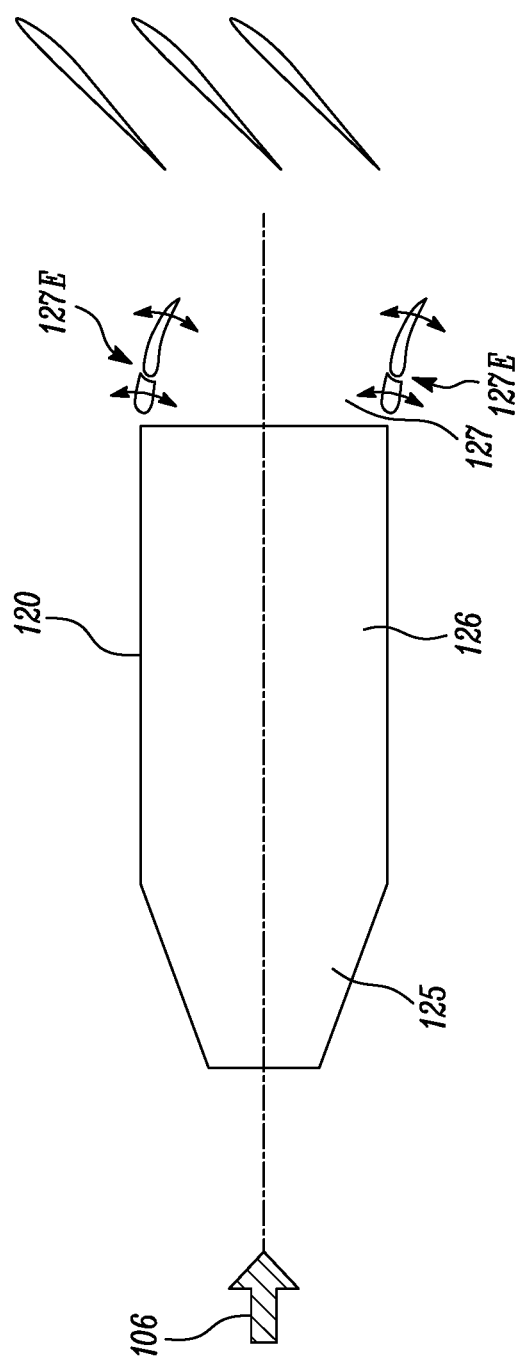
FIG. 11C shows a schematic view of the vane of FIG. 9 with a flow modulator in the form of a VIGV array.

In a further alternative arrangement, FIG. 11C illustrates a flow modulator 127E that takes the form of the exhaust portion 127 itself. In this arrangement, the heat exchange module 110 is close-coupled to an actuatable variable inlet guide vane (VIGV) array 127E. The close-coupling configuration provides for the fan assembly 130 to effectively 'suck' the incoming air flow 104 through both the hollow vanes 120 and the channels 124. Such an arrangement also enables the inlet duct 160 to be shorter provides for an axially more compact turbofan gas turbine engine.

Figure 12A:
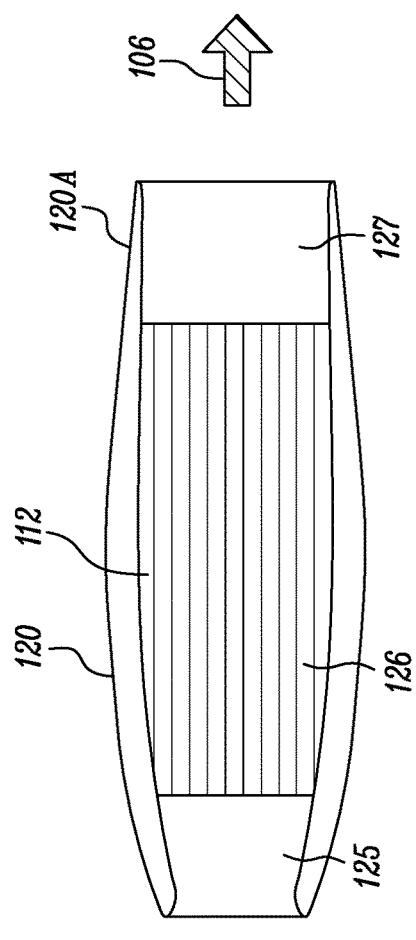
FIG. 12A shows a schematic axial sectional view across one of the vanes of the vane array of the heat exchanger module of FIG. 3 with the flow modulator forming the exhaust portion of the vane, and the modulator in a 'open' position.
Figure 12B:
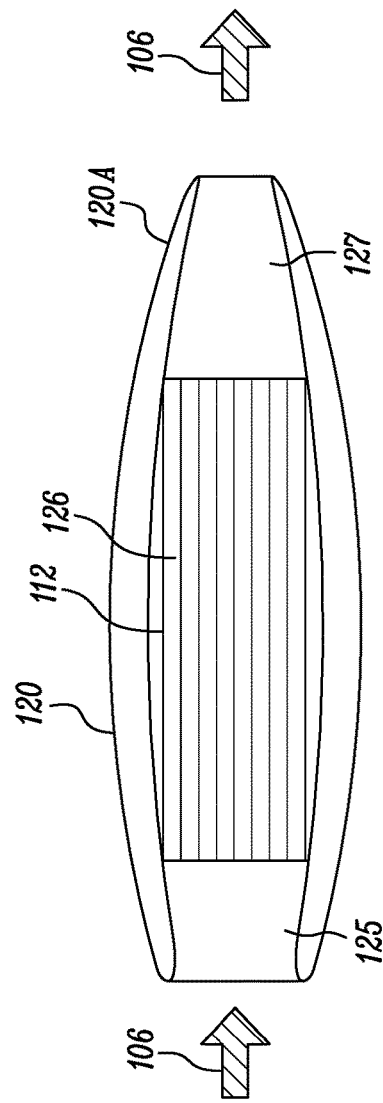
FIG. 12B shows a schematic axial sectional view of the vane of FIG. 12A with the modulator in a 'closed' position.

A further alternative form of the flow modulator 120A is illustrated in FIGS. 12A and 12B. In this arrangement the exhaust portion 127 of the hollow vane 120 is formed as the flow modulator 120A. In other words, the exhaust portion 127 is configured to change its shape in response to the user requirement to change the ratio of the mass airflows between the hollow vane 120 and the channel 124.

In the example shown in FIGS. 12A and 12B the exhaust portion 127 is formed from a shape memory alloy material. When the heat transfer elements 112 are in use the temperature of the vane airflow 106 will increase and the flow modulator 120A will open to thereby allow increased vane mass airflow $Flow_{Vane}$. Conversely when the heat transfer elements 112 are not in use the vane airflow 106 will have a lower temperature, causing the flow modulator 120A to close and restrict the vane mass airflow $Flow_{Vane}$. This will therefore reduce the aerodynamic losses associated with flow through the hollow vanes 120 when the heat transfer capability of the heat transfer elements 112 is not required.

The heat exchanger module 110 is in fluid communication with the fan assembly 130 by an inlet duct 160. The heat exchange module 110 has an axial length 115 of 0.4 m, this being 0.4 times the fan diameter of 0.9 m.

The inlet duct 160 extends between a downstream-most face of the heat transfer elements and an upstream-most face of the fan assembly. In the present arrangement, the inlet duct 160 is linear. However, in other arrangements the inlet duct 160 may be curved or convoluted.

The inlet duct 160 has a fluid path length 164 of 3.6 m, this being 4.0 times the fan diameter of 0.9 m. The fluid path length 164 extends along a central axis 162 of the inlet duct 160.

As outlined earlier, the heat exchanger module 110 has a flow area ($A_{HEX}$) 118. The heat exchanger module flow area 118 is the cross-sectional area of the heat exchanger module 110 through which an air flow 104 passes before being ingested by the fan assembly 130. In the present arrangement, the heat exchanger module flow area 118 has an annular cross-section and corresponds directly to the shape of the air flow passing through the heat exchanger module 110.

The fan assembly 130 has a corresponding flow area ($A_{FAN}$) 138. The fan assembly flow area 138 is the cross-sectional area of the fan assembly 130 through which an air flow 104 passes before separating into a core engine flow and a bypass flow. The fan assembly flow area 138 has an annular shape since it corresponds to the annular area swept by the fan blades 132.

In the present arrangement, the heat exchanger module flow area 118 is equal to the fan assembly flow area 138, and the corresponding ratio of $A_{HEX}/A_{FAN}$ is equal to 1.0.

The heat exchanger module 110 has a flow diameter (E) 116, which is the diameter of the air flow passing through the heat exchanger module 110. In the present arrangement, the heat exchanger module flow diameter 116 is equal to the fan diameter 136.

The heat exchanger module 110 comprises a plurality of heat transfer elements 112 for the transfer of heat energy from a first fluid 190 contained within the heat transfer elements 112 to an airflow 104 passing over a surface 113 of the heat transfer elements 112 prior to entry of the airflow 104 into the fan assembly 130. In the present embodiment, the first fluid 190 is a mineral oil. In other arrangements, the first fluid 190 may be an alternative heat transfer fluid such as, for example, a water-based fluid, or the fuel used by the turbofan gas turbine engine.

The heat transfer elements 112 have a conventional tube and fin construction and will not be described further. In an alternative arrangement, the heat transfer elements may have a different construction such as, for example, plate and shell.

The turbofan gas turbine engine 100 further comprises an outer housing 170. The outer housing 170 fully encloses the sequential arrangement of the heat exchanger module 110, inlet duct 160, fan assembly 130, compressor module 140, and turbine module 150. The outer housing 170 defines a bypass duct 180 between the outer housing 170 and the core engine components (comprising inter alia the compressor module 140 and the turbine module 150). In the present arrangement, the bypass duct 180 has a generally axisymmetrical annular cross-section extending over the core engine components. In other arrangements, the bypass duct 180 may have a non-symmetric annular cross-section or may not extend around a complete circumference of the core engine components.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

In addition, where a range of values is provided, it is understood that every intervening value, between the upper and lower limit of that range and any other stated or intervening value in that stated range, is encompassed within the invention.

Except where mutually exclusive, any of the features may be employed separately or in combination with any other features and the disclosure extends to and includes all combinations and sub-combinations of one or more features described herein.

What is claimed is:

1. A turbofan gas turbine engine comprising,
    an outer housing; and
    in axial flow sequence, a heat exchanger module, a fan assembly, a compressor module, a turbine module, and an exhaust module,
    wherein
        the heat exchanger module, the fan assembly, the compressor module, the turbine module, and the exhaust module are within the outer housing,
        the fan assembly comprises a plurality of fan blades defining a fan diameter (D),
        the heat exchanger module is in fluid communication with the fan assembly by an inlet duct,
        the heat exchanger module comprises a plurality of radially-extending hollow vanes arranged in a circumferential array with a channel extending axially between each pair of adjacent hollow vanes of the plurality of radially-extending hollow vanes, and
        the heat exchanger module has a square radial cross-sectional profile, the square radial cross-sectional profile being an overall shape of the heat exchanger module within the outer housing,
    wherein
        the hollow vanes each include a hollow portion through which a portion of an airflow passes prior to flowing to the fan assembly,
        one of the hollow vanes accommodates at least one heat transfer element in the hollow portion for transferring heat from a first fluid contained within the at least one heat transfer element to the portion of the airflow passing over a surface of the at least one heat transfer element, and the portion of the airflow enters the hollow portion before passing over the surface of the at least one heat transfer element, and
    the turbofan gas turbine engine is configured such that:
        the airflow enters the heat exchanger module with a mean velocity of 0.4 M, and is divided between a set of vane airflows through each of the hollow vanes having a mean velocity of 0.2 M and a set of channel airflows through each channel having a mean velocity of 0.6 M,
        the set of vane airflows includes the portion of the airflow, and
        each of the set of vane airflows flows through the hollow portion of a respective one of the hollow vanes.

2. The turbofan gas turbine engine as claimed in claim 1, wherein the square radial cross-sectional profile comprises a side length E, the side length E being in the range of 1.0*D and 1.5*D.

3. The turbofan gas turbine engine as claimed in claim 1, wherein a side length E of the square radial cross-sectional profile is less than D.

4. The turbofan gas turbine engine as claimed in claim 1, wherein each corner of the square radial cross-sectional profile comprises a curved profile.

5. The turbofan gas turbine engine as claimed in claim 1, wherein each one of the four corner regions of the square radial cross-sectional profile of the heat exchanger module accommodates one of the hollow vanes.

6. The turbofan gas turbine engine as claimed in claim 1, wherein the at least one heat transfer element extends axially within the corresponding one of the hollow vanes.

7. The turbofan gas turbine engine as claimed in claim 1, wherein the fan diameter D is between 0.3 m to 2.0 m.

8. The turbofan gas turbine engine as claimed in claim 1, wherein the heat exchanger module has a flow area $A_{HEX}$ and the fan module has a flow area $A_{FAN}$, and a ratio of $A_{FAN}$ to $A_{HEX}$ is 0.6 to 1.0.

9. The turbofan gas turbine engine as claimed in claim 1, wherein the fan assembly has two or more fan stages, at least one of the fan stages comprising the plurality of fan blades defining the fan diameter D.

10. The turbofan gas turbine engine as claimed in claim 1, wherein the fan diameter D is between 0.4 m to 1.5 m.

11. The turbofan gas turbine engine as claimed in claim 1, wherein the fan diameter D is between 0.7 m to 1.0 m.

12. The turbofan gas turbine engine as claimed in claim 1, wherein a circumferential space between adjacent ones of the hollow vanes is greater than a circumferential span of one of the hollow vanes.

13. A method of operating an aircraft comprising the turbofan gas turbine engine as claimed in claim 1, the method comprising using the turbofan gas turbine engine to take off from a runway, wherein a maximum rotational speed of the turbine module during take-off is in the range of from 12400 rpm to 24700 rpm.

14. A method of operating a turbofan gas turbine engine, the gas turbine engine comprising an outer housing and,
    in axial flow sequence, a heat exchanger module, an inlet duct, a fan assembly, a compressor module, a turbine module, and an exhaust module,
    the fan assembly comprising a plurality of fan blades defining a fan diameter (D),
    the method comprising:
    (i) providing the fan assembly, the compressor module, the turbine module, and the exhaust module within the outer housing;
    (ii) providing the heat exchanger module with a square radial cross-sectional profile within the outer housing, where a side length of the square radial cross-sectional profile is D and the square radial cross-sectional profile is an overall shape of the heat exchanger module within the outer housing;
    (iii) positioning the heat exchanger module in fluid communication with the fan assembly by the inlet duct;
    (iv) providing the heat exchanger module with a plurality of radially-extending hollow vanes arranged in a circumferential array with a channel extending axially between each pair of adjacent hollow vanes of the plurality of radially-extending hollow vanes, the hollow vanes each include a hollow portion through which a portion of an airflow passes prior to flowing to the fan assembly, at least one of the hollow vanes accommodating at least one heat transfer element in the hollow portion for transferring heat energy from a first fluid contained within the at least one heat transfer element to the portion of the airflow passing over a surface of the at least one heat transfer element; and (v) operating the gas turbine engine such that the portion of the airflow enters the hollow portion of the corresponding one of the hollow vanes before passing over the surface of the at least one heat transfer element, and wherein the airflow enters the heat exchanger module with a mean velocity of 0.4 M, and is divided between a set of vane airflows through each of the hollow vanes having a mean velocity of 0.2 M and a set of channel airflows through each channel having a mean velocity of 0.6 M, the set of vane airflows includes the portion of the airflow, and each of the set of vane airflows flows through the hollow portion of a respective one of the hollow vanes.

15. The method as claimed in claim 14, wherein each corner of the square radial cross-sectional profile comprises a curved profile.

* * * * *